(12) United States Patent
Colon et al.

(10) Patent No.: US 9,334,690 B2
(45) Date of Patent: May 10, 2016

(54) LADDER SLIDE BRACKET

(71) Applicants: Jeffrey T. Colon, Huntington Station, NY (US); Daniel Anthony Sweeney, Apex, NC (US)

(72) Inventors: Jeffrey T. Colon, Huntington Station, NY (US); Daniel Anthony Sweeney, Apex, NC (US)

( * ) Notice: Subject to any disclaimer, the term of this patent is extended or adjusted under 35 U.S.C. 154(b) by 0 days.

(21) Appl. No.: 14/733,131

(22) Filed: Jun. 8, 2015

(65) Prior Publication Data

US 2015/0354279 A1    Dec. 10, 2015

Related U.S. Application Data

(60) Provisional application No. 62/008,644, filed on Jun. 6, 2014.

(51) Int. Cl.
*E06C 7/14* (2006.01)
*F16B 2/12* (2006.01)
*F16B 2/00* (2006.01)
*F16B 2/18* (2006.01)
*F16M 13/02* (2006.01)

(52) U.S. Cl.
CPC . *E06C 7/14* (2013.01); *F16B 2/005* (2013.01); *F16B 2/12* (2013.01); *F16B 2/185* (2013.01); *F16M 13/022* (2013.01)

(58) Field of Classification Search
CPC ............ E06C 7/14; F16B 2/12; F16M 13/022
USPC ............................ 248/210, 211, 238; 182/129
See application file for complete search history.

(56) References Cited

U.S. PATENT DOCUMENTS

| | | | | |
|---|---|---|---|---|
| 2,923,514 A | * | 2/1960 | Showers | E06C 7/14 248/211 |
| 3,353,778 A | * | 11/1967 | Sylvain | E06C 7/14 248/211 |
| 6,024,192 A | * | 2/2000 | Griffin | B25B 1/2484 182/129 |
| 6,338,459 B1 | * | 1/2002 | Biggs | E06C 7/14 182/129 |
| 2003/0209387 A1 | * | 11/2003 | Burr | E06C 7/14 182/129 |
| 2005/0056485 A1 | * | 3/2005 | Tarlow | E06C 7/14 182/129 |
| 2011/0154623 A1 | * | 6/2011 | Schmidt | F16B 2/185 24/457 |

* cited by examiner

*Primary Examiner* — Gwendolyn Baxter
(74) *Attorney, Agent, or Firm* — Dilworth & Barrese, LLP

(57) ABSTRACT

A bracket for attachment to a ladder which includes a channel for engaging the vertical side rail of the ladder, the bracket having a base plate, means associated with the base plate for adjusting the width of the channel to conform to the width of the side rail; and a gripping mechanism associated with the base plate and which is movable between a first configuration wherein the bracket is frictionally engaged with the side rail and a second position releasing the side rail from frictional engagement such that the bracket can be slidably moved to a desired vertical position along the side rail.

15 Claims, 9 Drawing Sheets

LADDER SLIDE BRACKET

REFERENCE TO PRIOR APPLICATION

This application claims the benefit of U.S. Provisional Application No. 62/008,644 filed Jun. 6, 2014, the entire contents of which are incorporated herein by reference.

BACKGROUND

The present invention relates to a bracket which is attachable to a ladder for holding paint cans, tools and the like.

It is difficult when working on a ladder to carry and hold tools, brushes, and/or materials. For example, when a person stands upon one of the rungs of a ladder to paint the side of a structure, it is necessary to hold the paint can in one hand and the brush in the other, all the while maintaining one's balance on the ladder. This is tiring and difficult to do especially over long periods of time. It would not be unusual for a person so situated to drop the brush or spill paint from the can. This leads to unwanted and messy stains which must be cleaned up.

Various devices have been proposed for attachment to a ladder to assist the user in supporting a paint can or in holding tools. Many of these devices are designed to fit or clamp around central portions of one or more of the ladder rungs. When in place, these devices cover at least a portion of a rung that is located above the rung on which the user is standing. If the user wishes to ascend further up the ladder, such passage may be blocked, or at least made more difficult, by the installed device. The device might first have to be removed from the ladder to allow the user to proceed further up the ladder.

Other object holding accessories for a ladder are installed by inserting at least a portion of the accessory into one end of one of the rungs of a hollow rung ladder. For example, U.S. Pat. No. 5,259,525 to Wion shows a paint can holder having a handle or support arm that fits inside a hollow ladder rung. A wedge can be pounded in to wedge or lock the support arm in place.

Some ladder accessory devices are supported on brackets that fit around a side rail of the ladder. For example, one such device is disclosed in U.S. Pat. No. 7,967,264 to Peterson which discloses a U-shaped bracket having an adjustable width to be engaged with the side rail of a ladder. The Peterson device includes a paint can holder and a tray holder which are attachable to the bracket.

However, what is needed is a bracket support which is easily engageable with and slidably movable along a vertical side rail of a ladder.

SUMMARY

Provided herein is a bracket for attachment to a ladder the bracket includes a base plate; a channel for engaging the vertical side rail of the ladder, the bracket having an adjustable gripping plate associated with the base plate for adjusting the width of the channel to conform to the width of the side rail; and a gripping mechanism associated with the base plate and which is movable between a first position wherein the bracket is frictionally engaged with the side rail and a second position releasing the side rail from frictional engagement such that the bracket can be slidably moved to a desired vertical position along the side rail.

According to the present disclosure, a bracket is provided, the bracket includes a base plate; a channel positioned on a first side of the base plate, the channel defined by a first rail and a second rail; and a friction element positioned on the first side of the base plate, wherein the friction element is positionable between an engaged position and a disengaged position.

BRIEF DESCRIPTION OF THE DRAWINGS

Various embodiments are described below with reference to the drawings wherein.

Like reference numerals indicate similar parts throughout the figures.

DETAILED DESCRIPTION OF PREFERRED EMBODIMENT(S)

Figure 1:
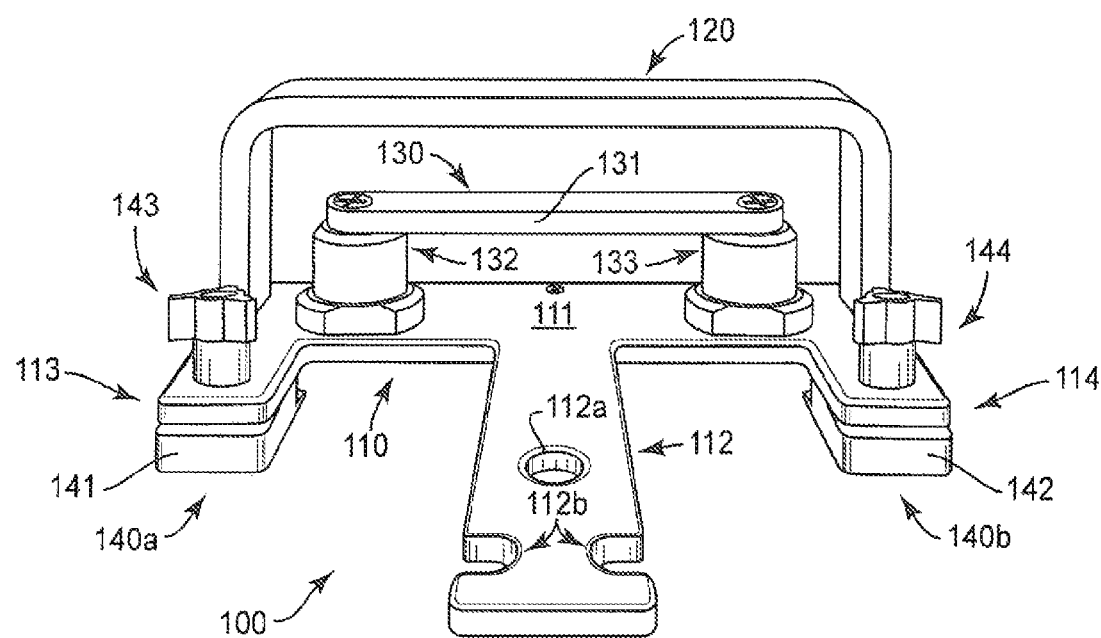
FIG. 1 is a front perspective view of the ladder slide bracket according to present disclosure.
Figure 2:
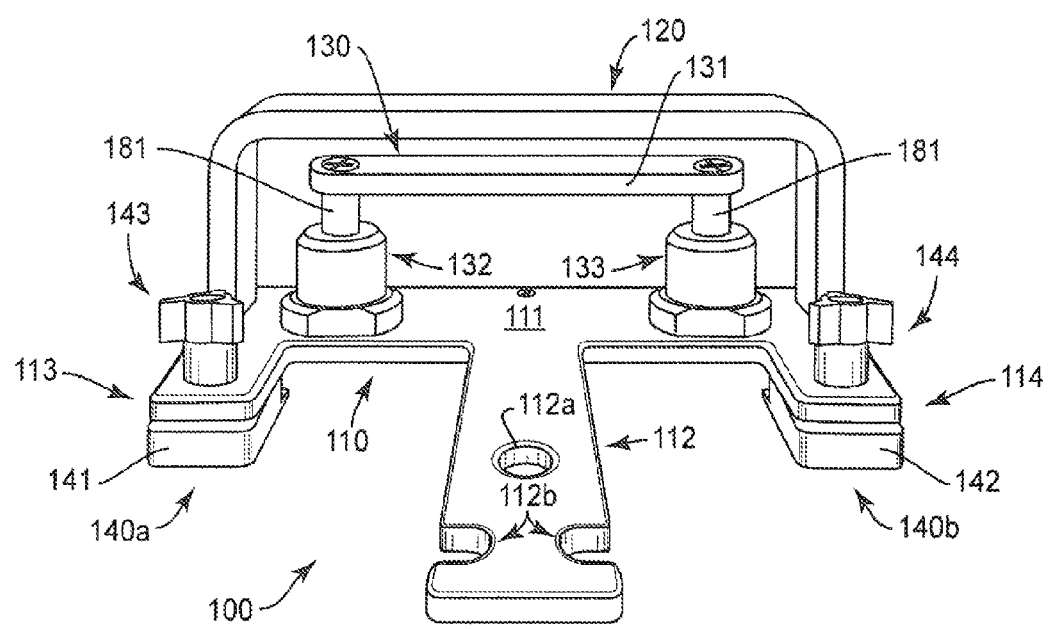
FIG. 2 is a front perspective view of the ladder slide bracket with the gripping mechanism in a tensioned position according to the present disclosure.
Figure 3:
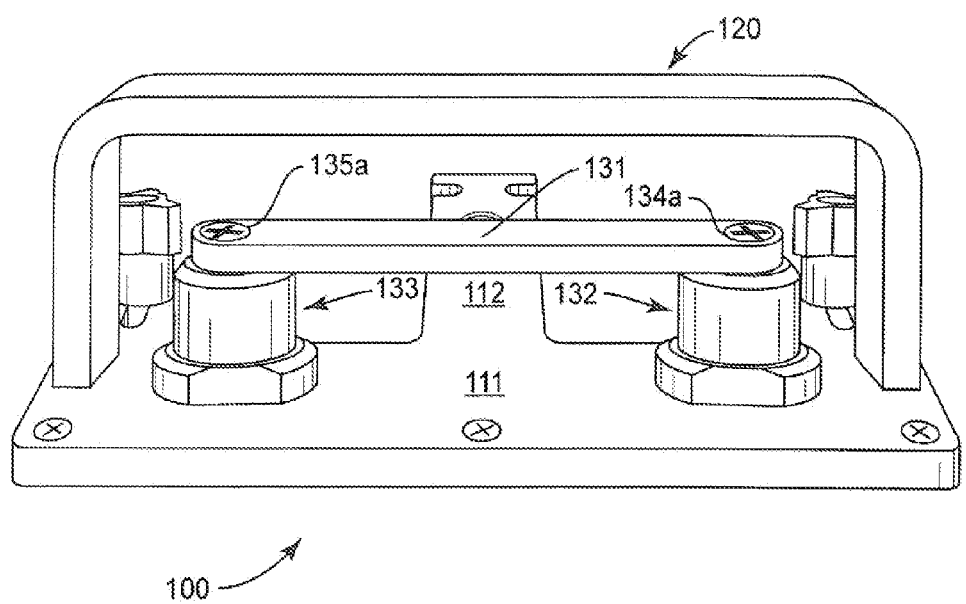
FIG. 3 is a rear perspective view of the ladder slide bracket according to the present disclosure.
Figure 4:
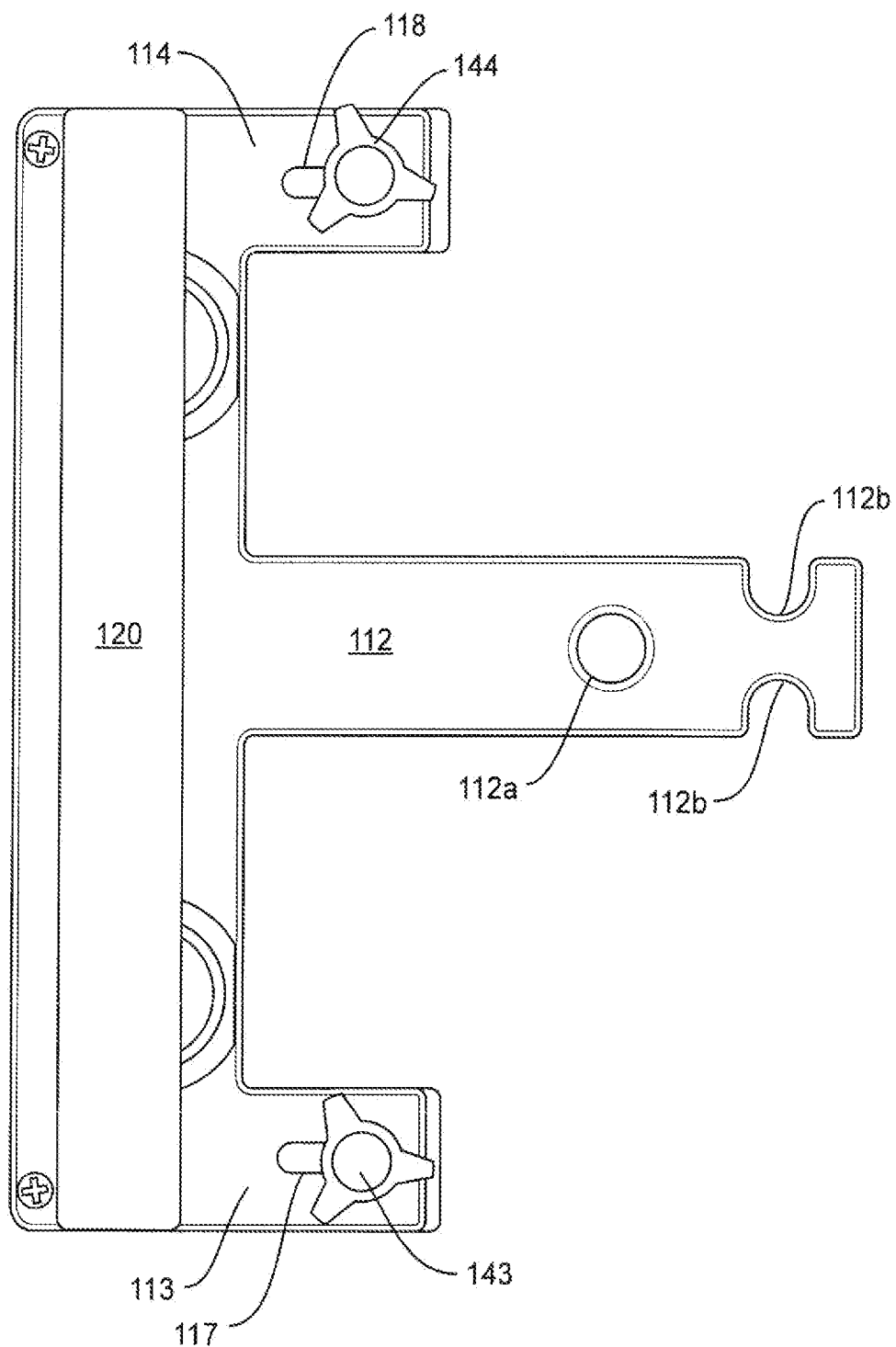
FIG. 4 is a top plan view of the ladder slide bracket according to the present disclosure.

The present disclosure may be understood more readily by reference to the following detailed description of the disclosure taken in connection with the accompanying figures, which form a part of this disclosure. It is to be understood that this disclosure is not limited to the specific devices, methods, conditions or parameters described and/or shown herein, and that the terminology used herein is for the purpose of describing particular embodiments by way of example only and is not intended to be limiting of the claimed disclosure.

Also, as used in the specification and including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Reference will now be made in detail to the exemplary embodiments of the present disclosure, which are illustrated in the accompanying drawings.

The present invention is a bracket which is slidably attachable to a vertical side rail of a ladder. The bracket provides convenient movable support for tools, paint cans, and painting implements such as brushes, rollers, etc. The support is not restricted to paint products, however, but any type of working tools, including a hammer, nails, screwdrivers, etc. Even further, the present invention is not restricted to a ladder, but any apparatus that requires convenient movable support for tools and supplies, such as the window washer platforms on a skyscraper or to be moved along an assembly line.

Bracket 100 includes a base plate 110, outer handle 120, inner movable gripping mechanism 130 and slide grip mechanisms 140a/140b.

More particularly, the base plate 110 is an E-shaped member (in top view) having a back portion 11, a center extension 112, and first and second end extensions 113/114. Center extension 112 and first and second end extensions 113/114 can be substantially parallel to each other and can extend substantially perpendicular from the same side of back portion 111. Center extension 112 can be longer than end extensions 113/114 which can be of substantially equal length. Center extension 112 includes an aperture 112a and recesses 112b, recesses 112b being on opposite edges of center extension 112.

The bottom of back portion 111 includes a rail 115 which defines a slot 116 extending along the lengthwise extension of back portion 111. Rail 115 may be a separate piece that is attached to base plate 110 via a fastening mechanism, such as a screw. Alternatively, rail 115 may be formed as a single piece of base plate 110. Slot 116 will be discussed in more detail below.

Bracket 100 includes a U-shaped outer handle 120 fixedly attached to back portion ill of base plate 110.

Inner movable gripping mechanism 130 is for adjustably securing bracket 100 at a vertical position along a side rail 180 of a ladder. Inner moveable gripping mechanism 130 includes a gripping bar 131, a piston 181 and a spring member 182 disposed within each of cylinders 132/133. Pistons 181 are resiliently biased by spring members 182 in cylinders 132/133 to an initial position, wherein gripping bar 131 is closest to the top of cylinders 132/133. Although two piston/spring/cylinder assemblies are shown, one more than two are contemplated.

The bottom ends of pistons 181 include flexible and/or resilient pads 136/137 which extend beyond the bottom of the base plate 110 into a channel 150 defined by base plate 110, rail 115 and rails 141/142 when gripping bar 131 is in an engaged position. A diameter of each pad 136/137 is smaller than a diameter of its respective piston 181. Pads 136/137 can be fabricated, for example, from a suitable polymeric or rubber material. Alternatively, pads 136/137 may be frictional elements that are capable of causing friction against a surface, and should not be restricted to polymeric or rubber materials.

In use, gripping bar 131 is grasped by a user of bracket 100 and manually pulled upward against the biasing force of spring members 182 such that pads 136/137 are disengaged from side rail 180.

Base plate 110 defines holes 136a/136b. Holes 136a/136b are smaller in diameter than the diameter of pistons 181 to prevent pistons 181 from passing through base plate 110. Conversely, the of holes 136a/136b are greater than the diameter of pads 136/137 to allow pads to pass through base plate 110 and extend passed the bottom of base plate 110.

Figure 9:
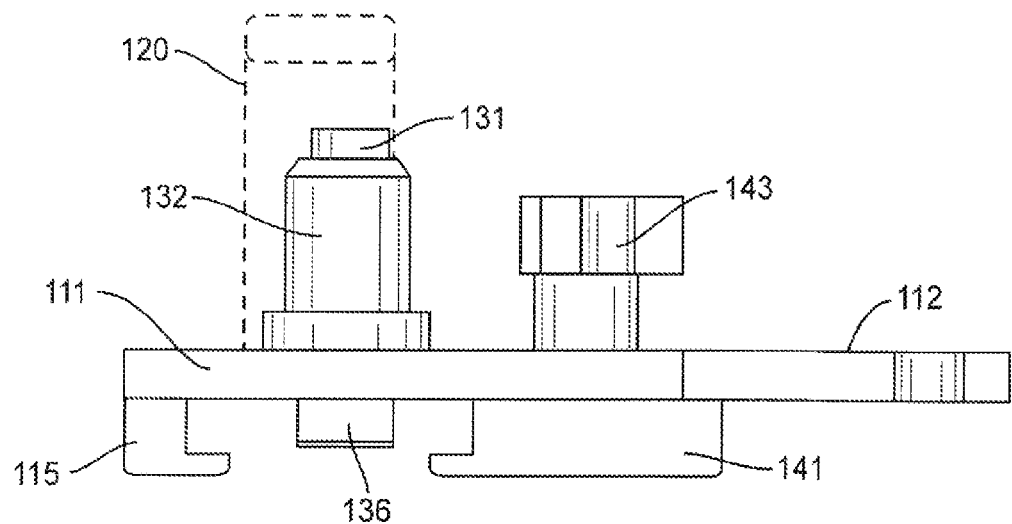
FIG. 9 is a side view of the ladder slide bracket with a gripping mechanism in an engaged position according to the present disclosure.
Figure 10:
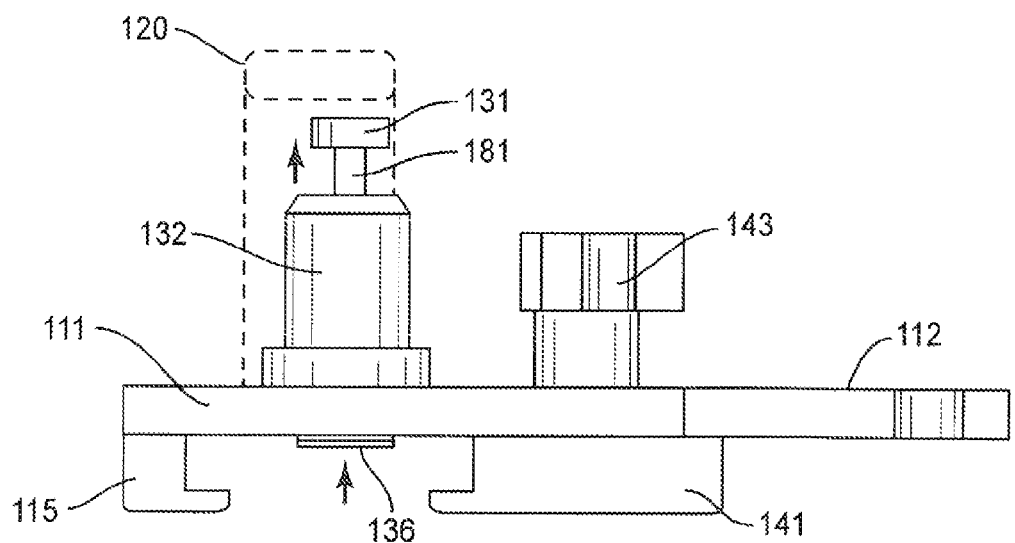
FIG. 10 is a side view of the ladder slide bracket with the gripping mechanism in a disengaged position according to the present disclosure.

FIGS. 9 and 10 depict the engaged and disengaged positions of gripping mechanism 130. FIG. 9 illustrates gripping mechanism 130 in a relaxed (i.e. engaged) position, where pad 136 extends passed bottom of base plate 110 and into channel 150, and gripping bar 131 is in a resting position relative to outer bar 120. FIG. 10 illustrates gripping mechanism 130 in a tensioned (i.e. disengaged) position, as illustrated by at least a partial withdrawal of pad 136 from channel 150, and the extension of gripping bar 131 upward relative to outer bar 120.

Figure 8:
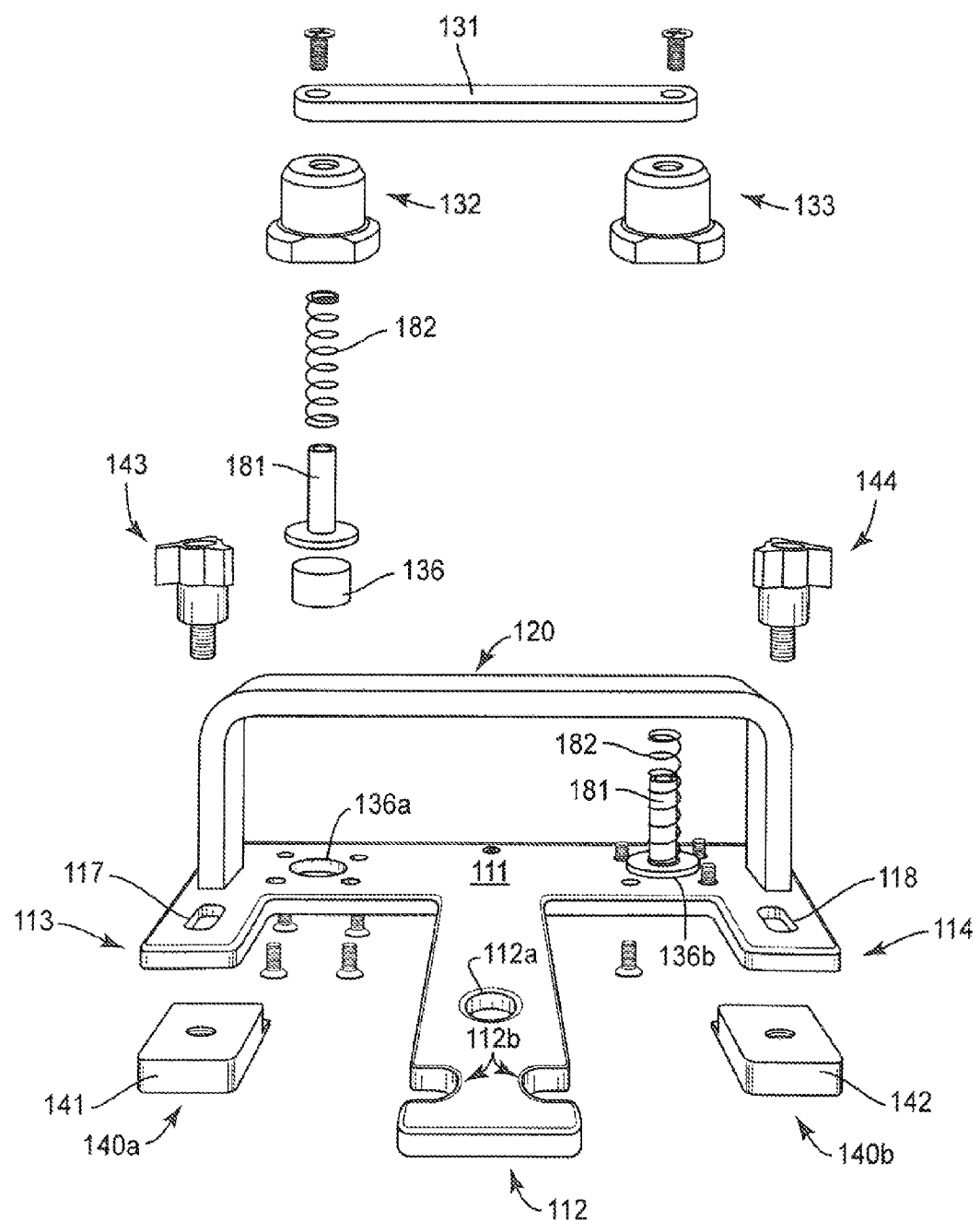
FIG. 8 is an exploded view of the ladder slide bracket according to the present disclosure.

FIG. 8 illustrates a front perspective view of gripping mechanism 130 in a tensioned position, as illustrated by the tensioned position of gripping bar 131 and the appearance of rods of pistons 181 between gripping bar 131 and cylinders 132/133. It is noted that in the engaged position and although described as a resting position, springs 182 remain under tension to create a constant force between pads 136/137 and side rail 180 of the ladder.

As an alternative embodiment, gripping mechanism 130 may utilize another mechanism other than gripping bar 131. For instance, instead of gripping bar 131 a rotational knob or mechanism may be used that withdraws pads 136 and 137 from channel 150 and move toward base plate 110. As another example, a trigger-type mechanism can be implemented that when squeezed moved pistons 181 from their engaged to disengaged position.

Figure 5:
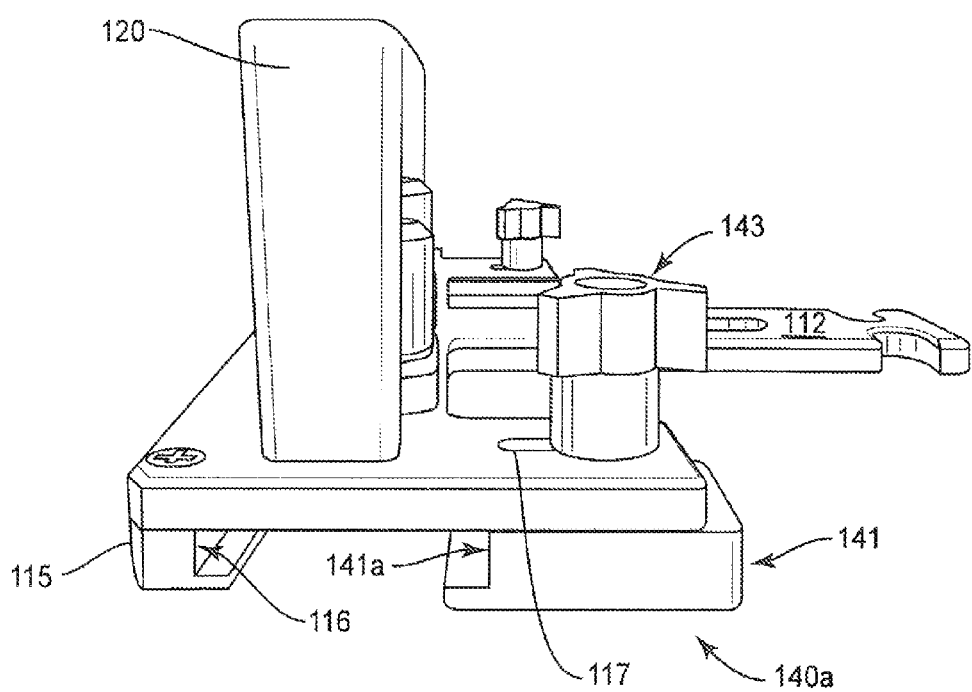
FIG. 5 is a side perspective view of the ladder slide bracket according to the present disclosure.
Figure 6:
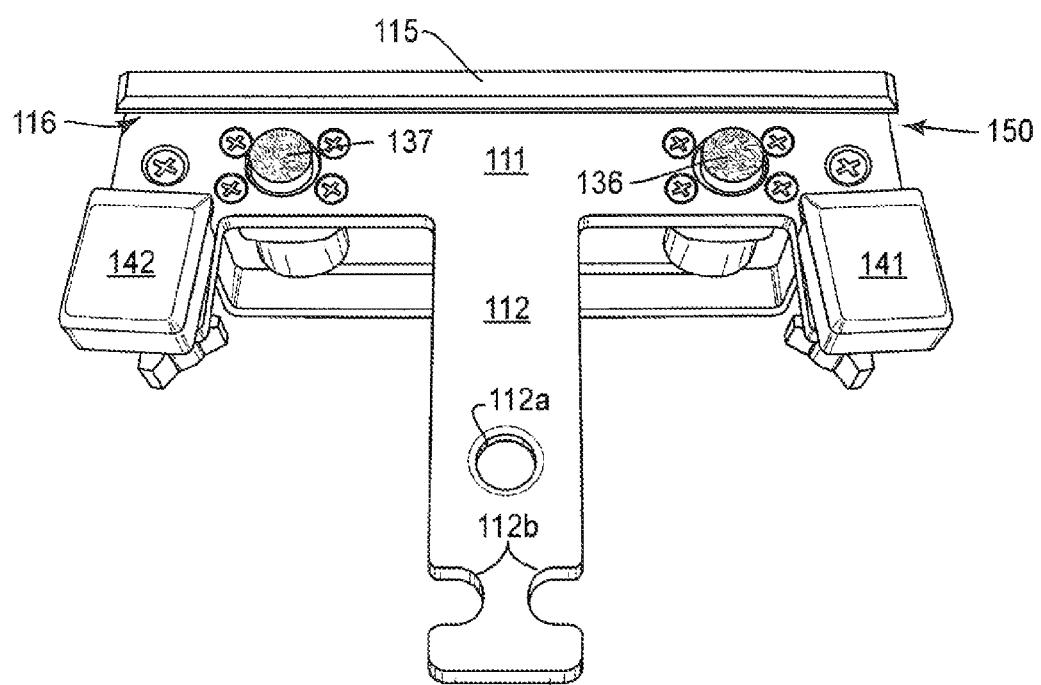
FIG. 6 is a bottom perspective view of the ladder slide bracket on a ladder according to the present disclosure.
Figure 7:
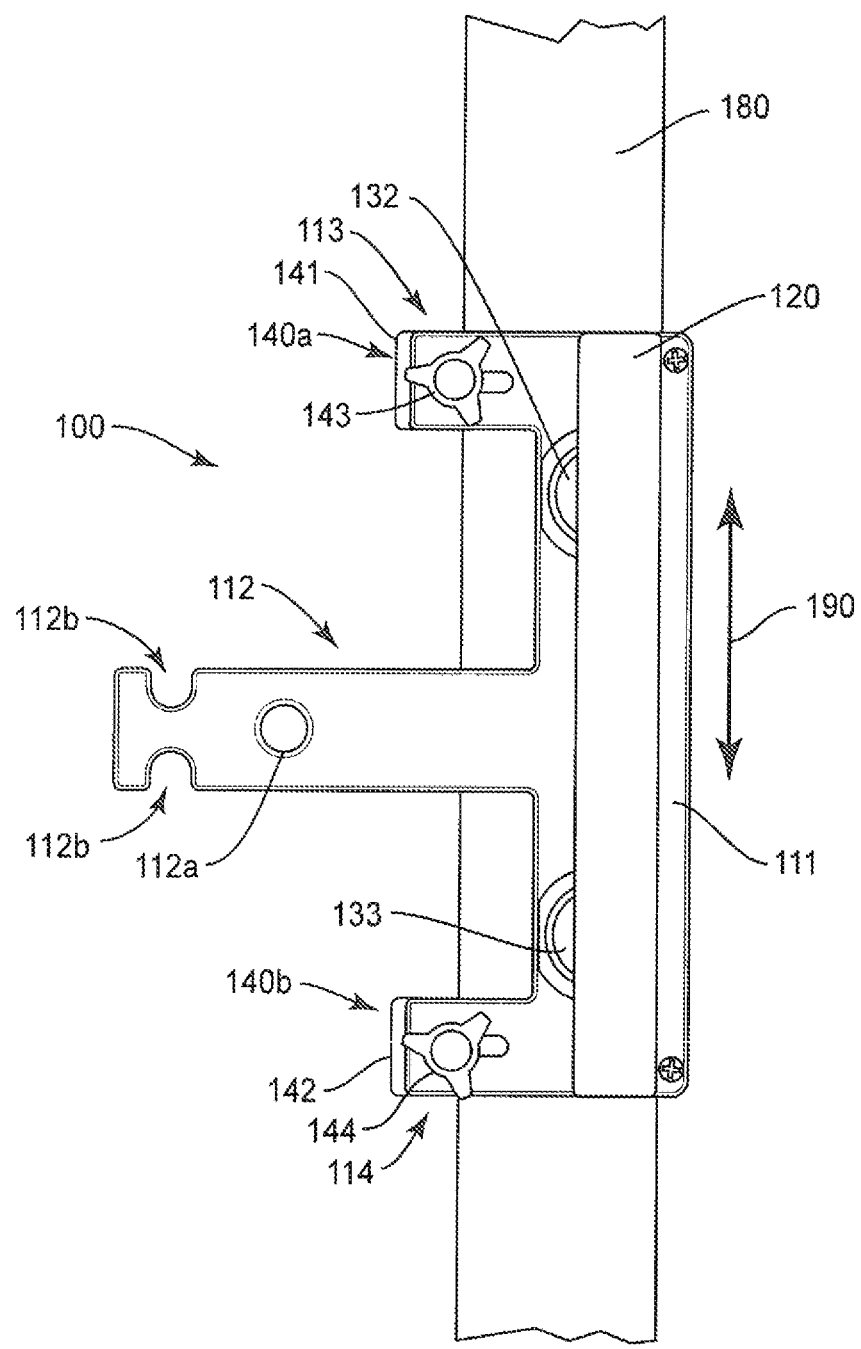
FIG. 7 is a top plan view of the ladder slide bracket according to the present disclosure.

Slide grip mechanisms 140a/140b are for providing a slidable engagement of bracket 100 along side rail 180 of the ladder. Slide grip mechanism 140a includes a first movable rail 141 slidably positionable on the bottom of first end extension 113 and slide grip mechanism 140b includes a second movable rail 142 slidably positionable on the bottom of second end extension 114. Each rail 141/142 defines a slot 141a (see FIG. 5). Said slots 141a face toward slot 116 of rail 115 of back plate 111 so as to define channel 150 with an adjustable width.

End extensions 113 and 114 each have a linear slot 117 and 118, respectively, which extends lengthwise along the end extension. A tightening screw 143 has a shaft disposed through slot 117 and engages gripping plate 141. Tightening screw 144 includes a shaft disposed through slot 118 and engages gripping plate 142.

In use, the tightening screws 143/144 can be loosened and moved distally along respective slots 117/118 away from back plate 111. This also moves respective rails 141/142 distally and spaces slots 141a of rails 141/142 further away from slot 116, thereby widening channel 150. Tightening screws 143/144 engages gripping plates 141/142 to back plate 116, securely defining channel 150. Gripping bar 131 is pulled by the user to withdraw pads 136/137 from channel 150. Bracket 100 can then be mounted to the side rail of the ladder such that the side rail extends through channel 150. Gripping bar 131 is released which brings pads 136/137 into frictional contact with side rail 180, thereby securing bracket 100 at a vertical position along side rail 180. Tightening screws 143/144 are then moved linearly along slots 117/118 towards back plate 111, which thereby moves gripping plates 141/142 proximally and bringing their notches closer to slot 116. This adjusts the width of channel 150 to conform to the width of side rail 180 of the ladder.

Center extension 112 is positioned to extend from side rail 180 of the ladder. Aperture 112a and recesses 112b allow tools, paint cans, and various implements to be hung from the center extension 112. Other characteristics of center extension 112 are also available, such as protrusion therefrom of variable sizes and also different sized apertures and recesses. Alternatively, other extensions and mechanisms may be attached to center extension 112 that also hold tools and supplies, such as a separate extension that extends perpendicularly or (or other angle) from center extension 112. This may result in the opportunity to hold even more tools or supplies.

Opposite lacing recesses 112b permit bracket 100 to be mounted on either side of the ladder to insure that there will always be an upward facing recess 112*b* to which an object can be engaged. In addition, when objects are suspended from center extension 112 a torque is created on bracket 100 further engaging rails 115/141/142 with side rail 180 of the ladder.

As an alternative, center extension 112 may not extend directly from the center of bracket 100, but from any portion of bracket 100. For instance, center extension may be positioned anywhere on base plate 110, such as closer or farther from first and second end extensions 113 and 114. Alternatively, there may be a plurality of center extensions extending from various lengths from base plate 110, even from any of the four sides and corners of base plate 110.

The vertical position of bracket 100 is easily adjustable. To move bracket 100 vertically along side rail 180 of the ladder, gripping bar 131 is manually pulled to withdraw pads 136/137 from frictional contact with side rail 180. This allows bracket 100 to slide upward or downward to a new position where gripping bar 131 is then released and bracket 100 is then fixedly secured at the new position.

Bracket 100 is preferably fabricated from a material capable of withstanding the mechanical stresses of supporting items such as heavy cans of paint. For example, bracket 100 may hold anywhere between 3-5 pounds of tools and/or supplies. However, bracket 100 should be able to hold anywhere up to 50 pounds and more, depending on the overall design and size of the bracket and components thereof. For example, if a small amount of weight is necessary, then smaller and less robust pads 136 and 137 (or friction elements) may be used. Alternatively, if more weight is required, then a larger sized bracket along with larger pads 136 and 137 can be used. For instance, a larger bracket may cover more area longitudinally on the side rail of the ladder. Even further, multiple pads may be used to provide additional support as well. In an embodiment, bracket 100 can be fabricated from stainless steel, aluminum, bronze, brass and the like. Alternatively, high strength engineering ing plastics such as polycarbonate, polyetherketone (PEEK), polyamide-imide (PAI), polyetherimide (PEI), and the like. Bracket 100 can be constructed in such dimensions so as to accommodate various sizes of ladders.

The present disclosure is advantageous in that bracket 100 can easily and conveniently slide up and down the ladder for a worker. When worker has to climb a ladder and needs his tools next to him or her, then the ladder slide bracket allows the user to easily do so without having to haul the tools and supplies around him or herself. This is advantageous not only in regard to making the worker's job easier, quicker and more convenient, but also safer so that the worker does not need to risk holding onto the ladder with only one hand, or carrying the tools and supplies in multiple pockets throughout their body.

While the above description contains many specifics, these specifics should not be construed as limitations of the invention, but merely as exemplifications of preferred embodiments thereof. Those skilled in the art will envision many other embodiments within the scope and spirit of the invention as defined by the claims appended hereto.

What is claimed is:

1. A bracket for attachment to a ladder, the bracket comprising:
    a base plate;
    a channel for engaging the vertical side rail of the ladder, the bracket having an adjustable gripping plate associated with the base plate for adjusting the width of the channel to conform to the width of the side rail; and
    a gripping mechanism associated with the base plate and which is movable between a first position wherein the bracket is frictionally engaged with the side rail and a second position releasing the side rail from frictional engagement such that the bracket can be slidably moved to a desired position along the side rail, wherein the gripping mechanism comprising:
        at least one pad frictionally engageable with the side rail;
        a cylinder, a piston and a spring housed within the cylinder; and
        a handle, the piston being attached at a first end to the pad and at a second end to the handle,
            wherein when the handle is moved the gripping mechanism is moved between the first position and the second position.

2. The bracket of claim 1, wherein the spring provides constant tension between the piston and the cylinder.

3. The bracket of claim 1, wherein when the gripping mechanism is in the second position, the spring becomes further tensioned.

4. The bracket of claim 1, wherein when the gripping mechanism is in the first position, the spring exerts pressure on the piston to provide force to create frictional engagement of the bracket against the side rail.

5. The bracket of claim 1, further comprising an outer handle positioned adjacent to the gripping mechanism, wherein the outer handle provides support when grabbing the gripping mechanism.

6. The bracket of claim 1, wherein the base plate includes a center extension including an aperture or notch.

7. The bracket of claim 6, wherein the center extension exerts pressure on the base plate, thereby causing an increase in torque to be exerted by the bracket and the side rail.

8. An apparatus, comprising:
    a base plate;
    a channel positioned on a first side of the base plate, the channel defined by a first rail and at least one second rail;
    a friction element extending from the first side of the base plate, wherein the friction element is positionable between an engaged position and a disengaged position;
    a lever associated with the friction element, wherein movement of the lever causes the friction element to move relative to the base plate, the lever further comprising a cylinder and a piston and a spring contained within the cylinder, the piston attached at a first end to the lever and at a second end to the friction element, wherein movement of the lever causes the friction element to move relative to the base plate; and
    a fixed support member positioned adjacent to the lever, wherein the fixed support member provides support during movement of the lever.

9. The apparatus of claim 8, wherein the first rail is fixed and the at least one second rail is movable relative to the first rail to adjust a width of the channel.

10. The apparatus of claim 8, further comprising an extension component associated with the base plate, wherein the extension component extends outward from the base plate.

11. The apparatus of claim 10, wherein the extension component includes a bore or a notch.

12. The apparatus of claim 8, wherein a width of the channel is configured to correspond to a side of a ladder.

13. The apparatus of claim 8, wherein when the lever is in a first position, the spring exerts pressure on the piston to provide force to extend the frictional element through the base plate.

14. A bracket for attachment to a ladder, the bracket comprising:
- a base plate;
- a channel for engaging the vertical side rail of the ladder, the bracket having an adjustable gripping plate associated with the base plate for adjusting the width of the channel to conform to the width of the side rail; and
- a gripping mechanism associated with the base plate and which is movable between a first position wherein the bracket is frictionally engaged with the side rail and a second position releasing the side rail from frictional engagement such that the bracket can be slidably moved to a desired position along the side rail,
  - wherein the gripping mechanism further includes a cylinder and a piston and a spring positioned within the cylinder, wherein when the gripping mechanism is in the first position, the spring exerts pressure on the piston to provide force to create frictional engagement of the bracket against the side rail.

15. The bracket for attachment to the ladder of claim 14, wherein:
- the gripping mechanism further comprises a handle, the handle configured to move the gripping mechanism between the first position and the second position.

* * * * *